United States Patent [19]

Wolff

[11] 4,377,810

[45] Mar. 22, 1983

[54] LIGHT PEN DETECTION CIRCUIT AND METHOD

[75] Inventor: Kenneth T. Wolff, Medway, Mass.

[73] Assignee: Data General Corporation, Westboro, Mass.

[21] Appl. No.: 213,244

[22] Filed: Dec. 4, 1980

[51] Int. Cl.³ .............................................. G09G 1/16
[52] U.S. Cl. .................................... 340/707; 340/744
[58] Field of Search ............................... 340/707, 708

[56] References Cited

U.S. PATENT DOCUMENTS 3,505,561 4/1970 Ward et al. ...................... 340/707 X
3,512,037 5/1970 Eckert et al. .................... 340/707 X
4,093,996 6/1978 Hogan et al. .................... 340/707 X Primary Examiner—David L. Trafton
Attorney, Agent, or Firm—Robert L. Dulaney

[57] ABSTRACT

Electronic apparatus and method for determining location of the sensing aperture of a light pen on the face of a raster scan monochrome CRT is disclosed. In a preferred embodiment, logic circuitry and cascaded counters are used to determine position information for the earliest horizontal detection of light during each frame. Apparatus is included for retaining the position information and making it available to the CRT processor for use in generating a cursor.

15 Claims, 4 Drawing Figures

LIGHT PEN DETECTION CIRCUIT AND METHOD

BACKGROUND OF THE INVENTION

1. Field of the Invention

The present invention relates generally to cathode ray tube (CRT) displays and particularly to circuitry and methodology for determining location of a light pen on the face of a CRT.

2. Description of the Prior Art

Light pens are generally hand-held, light detecting devices which allow a human operator to initiate and/or perform various data processing operations or manipulations by placing the sensing aperture of the light pen adjacent to an appropriate location on the face of its associated CRT. The image on a CRT is generated by using an electron beam to stimulate selected areas of a phosphorescent material located on the inside of the CRT screen. The scanning of the CRT face is accomplished by deflecting the electron beam relatively rapidly in one direction, usually horizontal, and relatively slowly in a second direction, usually vertical. The phosphorescent material on the screen is continuous, but the screen can be considered to consist of a large number of generally horizontal, parallel "raster lines" or lines of displayed information. As the beam scans along a raster line, the information about the level of stimulation to be given a particular area on the raster line is updated at fixed intervals in accordance with a clock pulse from the CRT timing unit. Therefore, each raster line can be further considered to be a series of discrete segments or "dots" which are individually stimulatable by the electron beam.

The electron beam normally performs 50 to 60 "frames" or complete scans of the CRT screen per second, depending on the external electrical power available. From the viewpoint of an observer facing the screen, the beam begins a frame at the left side of the top raster line of the CRT and moves horizontally along the line to the right side of the screen stimulating each dot to the appropriate level to create the desired image. The beam then performs a horizontal retrace to the left side of the next lower raster line and again begins to scan horizontally to the right. This continues until the beam reaches the right side of the lowest raster line, at which time a vertical retrace is performed during which the beam moves back to the beginning of the top raster line to begin the next frame.

When the sensing aperture of the light pen is placed against or in proximity to the CRT face, it can sense the beam passing its "field of view" during each scan cycle. The processing unit associated with the CRT and light pen can, therefore, determine precise location of the pen on the CRT face by utilizing information about when the beam was detected by the pen.

Accurate, repeatable determination of light pen location, however, has been a long standing problem in industry. Prior art techniques for identifying the site of the light pen suffer from a substantial amount of noise and jitter. A cursor is commonly displayed on the CRT screen to indicate to the operator where the processor has determined the light pen to be. In prior art devices the cursor often exhibits jitter in that it is very difficult for the operator to place and/or hold the cursor in a desired location or to move the cursor along a desired path. These problems serve to substantially reduce the effective definition capability of the screen.

The present invention relates to a novel light pen detection circuit and method which allow the cursor generated by the CRT to exhibit greatly reduced jitter and noise.

SUMMARY OF THE INVENTION

The present invention relates to apparatus and method for determining the location of the sensing aperture of a light pen on the face of a raster scan, monochrome CRT. A circuit for implementing the invention includes apparatus for identifying the CRT dot locations sensed by the sensing aperture and apparatus for selecting a unique dot location from said set.

It is a further feature of this invention that the apparatus for selecting a unique dot location determines the horizontal and vertical location of the dot which was detected closest to a vertical edge of the CRT face.

It is another feature that the circuit for implementing the invention includes clock cycle counters, apparatus for loading, starting and stopping the counters, and apparatus for latching vertical position information.

It is yet another feature that the circuit includes apparatus for generating a signal to indicate that at least one illuminated dot was detected during a frame.

It is still yet another feature of the invention that the dot location selected is on a raster line that is substantially centrally located under the sensing aperture of the light pen.

It is an additional feature that the dot location selected is the first dot location sensed by the light pen on the raster line substantially centrally located under the sensing aperture.

It is an advantage of the invention that jitter in the displayed cursor is substantially reduced.

Other features and advantages of the present invention will be understood by those of oridinary skill in the art after referring to the detailed description of preferred embodiments and drawings wherein:

DESCRIPTION OF THE PREFERRED EMBODIMENT

INTRODUCTION

Figure 3:
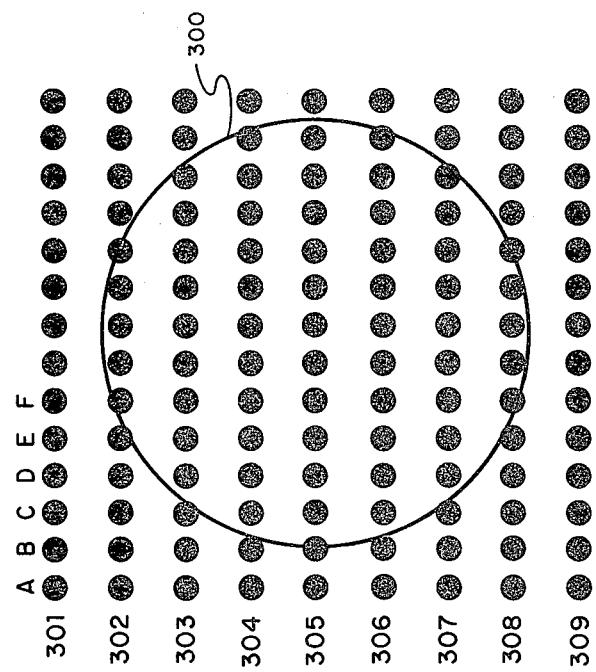
FIG. 3 is an illustration of the light pen aperture relative to CRT raster lines.

By way of introduction, it should be understood that the present invention relates to a technique for reducing noise and jitter in a displayed cursor using logic circuitry and cascaded counters. Referring to FIG. 3, a small area or segment of the CRT screen is represented. (As discussed in the section on prior art, the phosphorescent material on the CRT screen is continuous and there are no individual "dots," as such. However, the electron beam is modulated at discrete time intervals which can be correlated to physical screen locations. FIG. 3 is, therefore, intended to be illustrative only and does not necessarily represent actual spatial relationships.) This segment, shown enlarged, depicts only dots in the immediate vicinity of the light pen aperture as the light pen is held in proximity to the CRT face. Numerals and letters are solely for reference in discussing the figure. Circle 300 represents the periphery of the sensing aperture of the light pen. It can be seen that the light pen aperture is large in relation to size of an individual dot and that several raster lines are covered by the aperture at any given time. The light pen will, therefore, sense light at multiple locations on several raster lines. The discussion below relates to operation of the detection circuit in selecting a unique dot location for use by the processor as a reference point in generating the cursor display in a highly repeatable manner, thus avoiding jitter of the cursor.

The cascaded counters are preset to a specific value and logic is provided to restart the counters whenever an illuminated dot is detected by the light pen closer to the beginning of a raster line (in this embodiment, the left-most dot on a raster line is considered the beginning) than had been detected on any previous raster line during that vertical scan. Because the sensing aperture of the light pen is substantially circular, the earliest light detection will correspond to the first dot seen by the light pen aperture on the raster line most centrally located under the aperture. Logic is also provided to retain this unique dot location of earliest light detection until the information is read by the processor. Accordingly, the location for the cursor is precisely determined.

INTERCONNECTION

Figure 1:
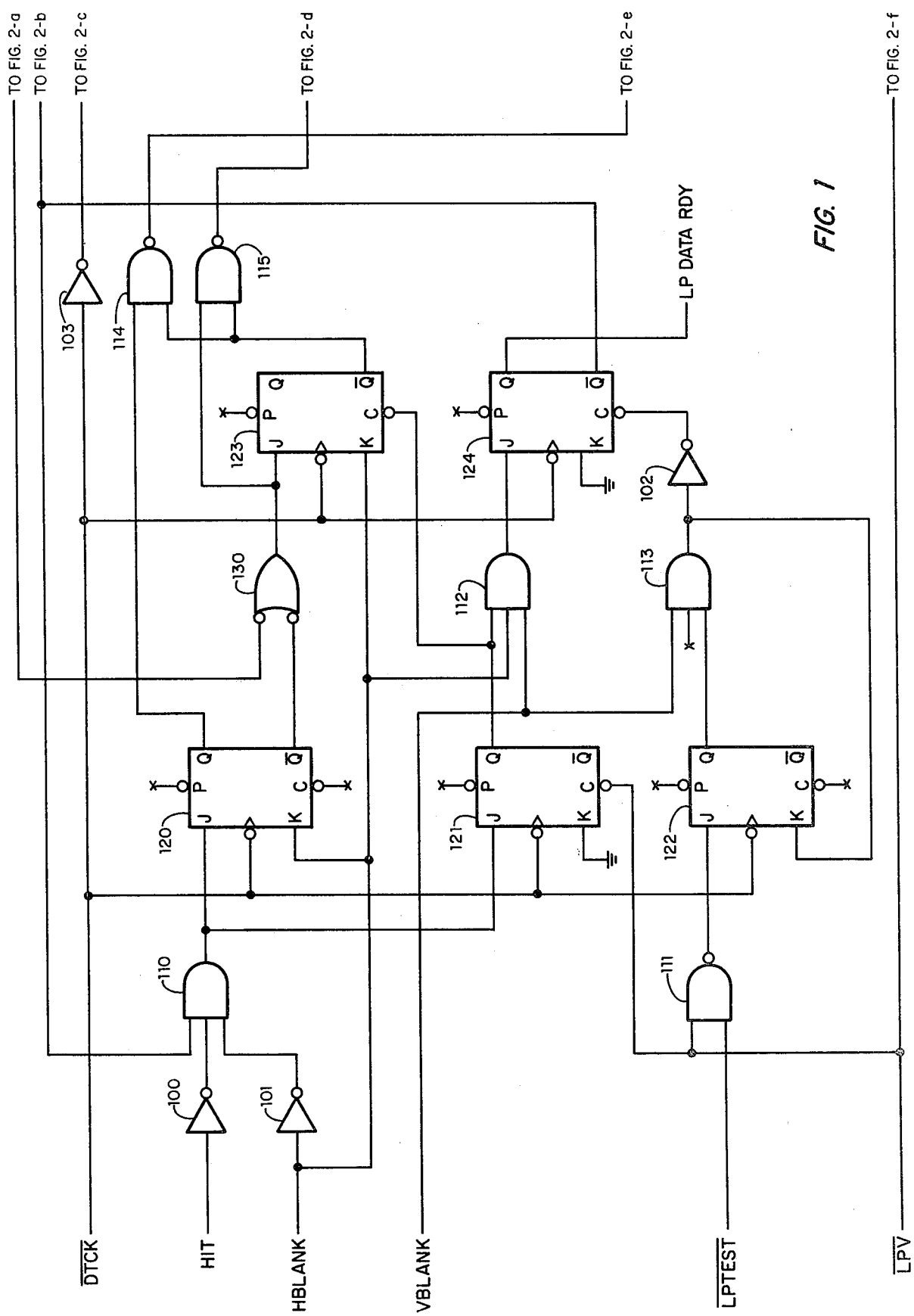
FIG. 1 is a portion of an illustrative embodiment of the invention.
Figure 2:
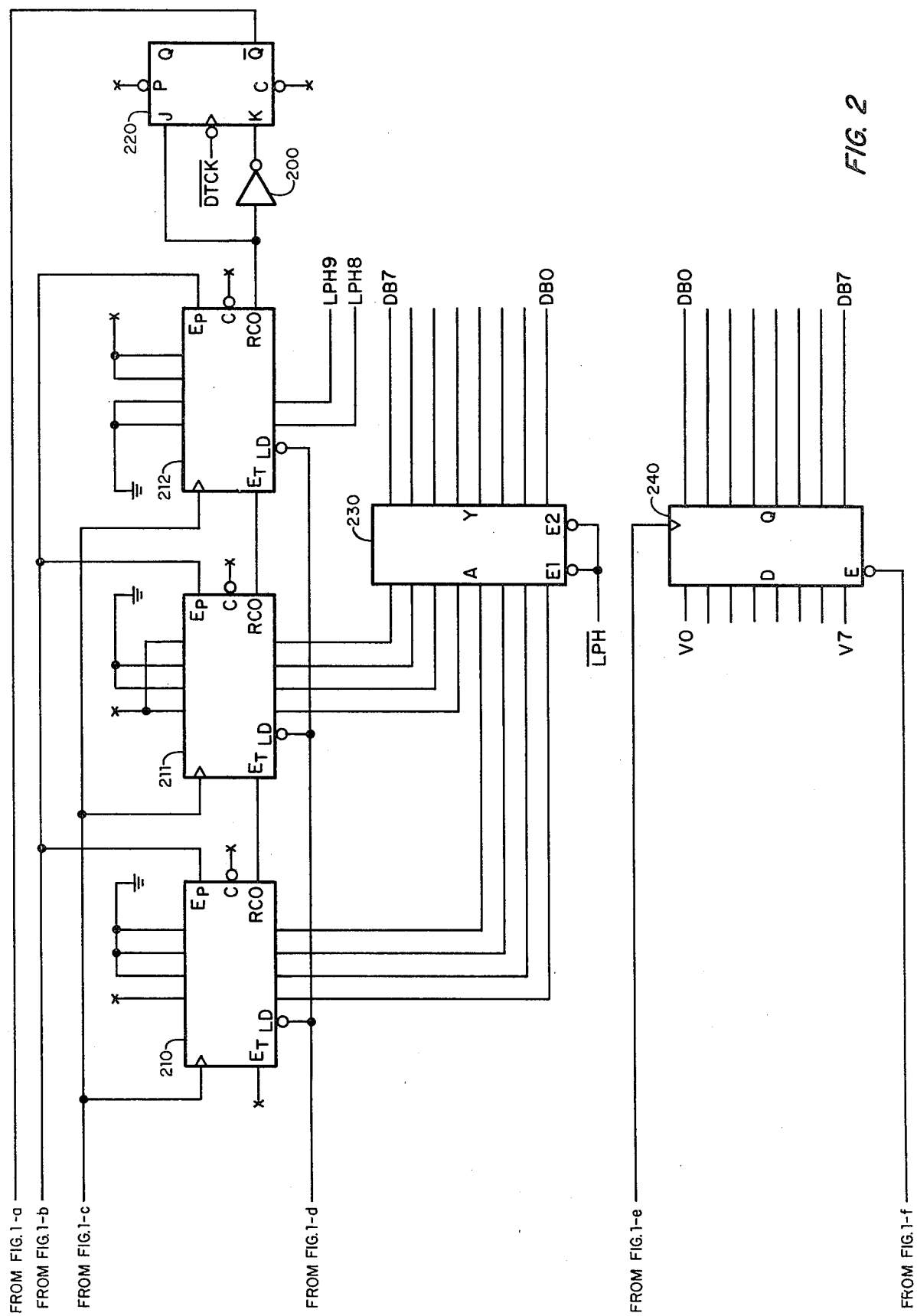
FIG. 2 is the remaining portion of the illustrative embodiment of the invention.

An interconnection description of the present invention is now presented. Referring to FIGS. 1 and 2, it should be understood that presence of a small circle at an input of a logic device indicates that the device is enabled by a low input. A circle appearing at an output of a logic device indicates that output of that device will be low if all input conditions are satisfied. It should also be noted that some inputs to logic circuits are held in a low state, indicated by a "ground" symbol, or a high state, indicated by an "X".

Signal lines a-f on the right hand side of FIG. 1 are the same lines a-f as appear on the left side of FIG. 2. FIGS. 1 and 2, therefore, are divided merely to avoid overcrowding of elements and should be considered together.

The $\overline{\text{DTCK}}$ signal is provided to clocking ports of flip-flops 121-124 (for example, 74LS112's), flip-flops 120 and 220 (for example, 74S112's), and, through inverter 103 (for example, a 74S04), to counters 210-212 (for example, 74LS163's). HIT is supplied, through inverter 100 (for example, a 74LS04), as an input of AND gate 110 (for example, 74LS11). HBLANK is connected as an input of AND gate 112 (for example, a 74LS11), as K input of flip-flops 120 and 123 and, through inverter 101 (for example, a 74LS04), as an input to AND gate 110. The third input to gate 110 is connected to the $\overline{\text{Q}}$ output of flip-flop 124. VBLANK is connected as an input to AND gates 112 and 113 (for example, a 74LS11), $\overline{\text{LPV}}$ is supplied as an input to buffer 230 (for example, a 74LS244) and $\overline{\text{LPV}}$ is connected as an input to NAND gate 111 (for example, a 74LS00) and latch 240 (for example, a 74LS374) and as C input of flip-flop 121. Finally, $\overline{\text{LPTEST}}$ is provided as the second input of NAND gate 111.

Output of AND gate 110 is connected as J input of flip-flops 120 and 121. The Q output of flip-flop 120 is connected as an input of NAND gate 114 (for example, a 74LS00). The $\overline{\text{Q}}$ output of flip-flop 120 is provided as an input to NAND gate 130 (for example, a 74LS00), output of which is connected as an input to NAND gate 115 (for example, a 74LS00) and flip-flop 123. The $\overline{\text{Q}}$ output of flip-flop 123 provides the second input to NAND gates 114 and 115.

Figure 4:
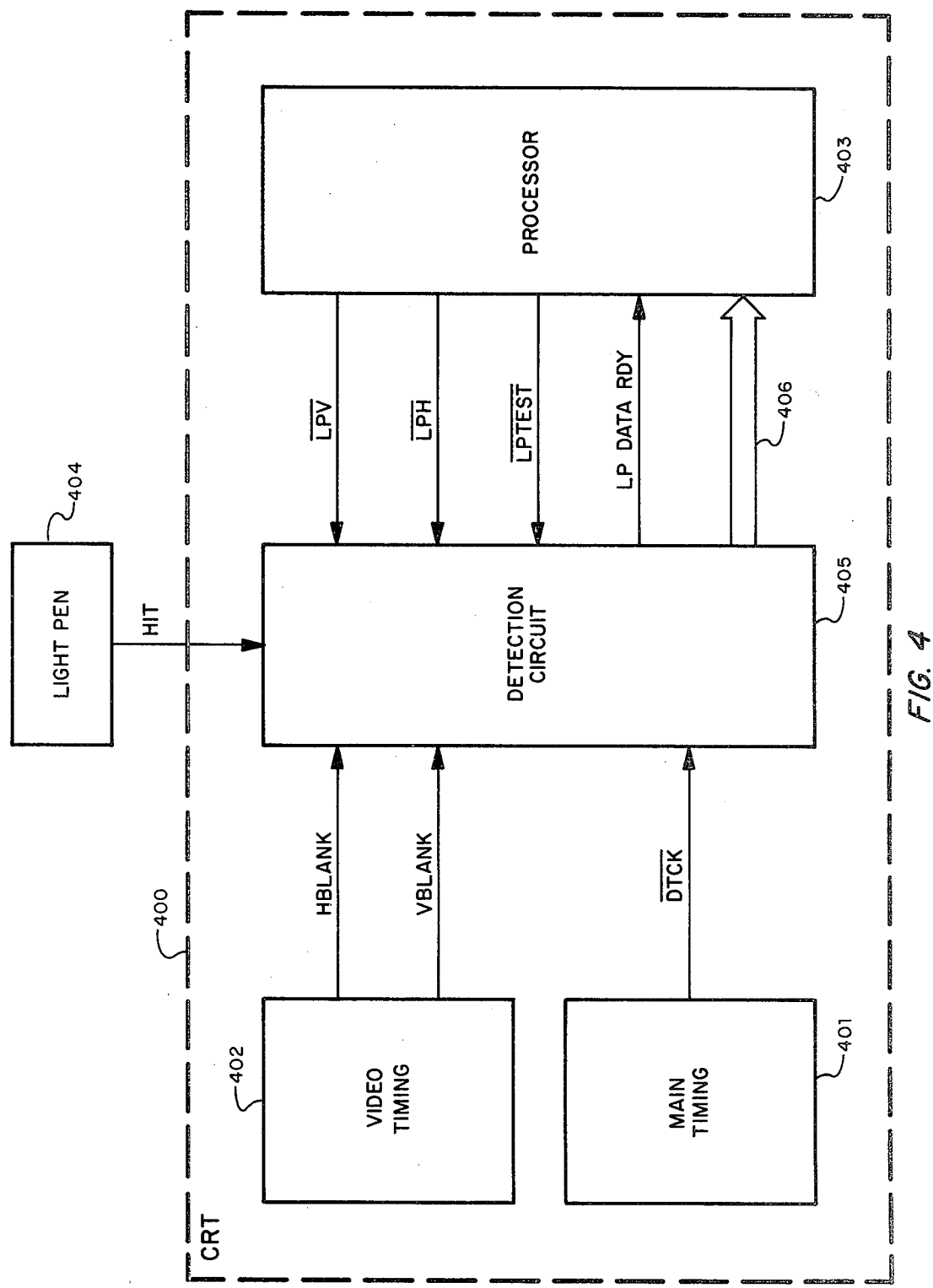
FIG. 4 is a block diagram showing signal interconnections.

Output of NAND gate 114 is connected to latch 240. Output of NAND gate 115 is supplied as an input to counters 210-212. Counters 210-212 are connected such that carry over output of counter 210 is provided as an input to counter 211, and likewise carry over output of counter 211 is provided to counter 212. The carryover output of counter 212 is provided to J input of flip-flop 220 and, through inverter 200 (for example, a 74LS04), K input of flip-flop 220. The $\overline{\text{Q}}$ output of flip-flop 220 is returned as an input to NAND gate 130. Counters 210 and 211 are also connected to buffer 230. The outputs of counter 212, buffer 230 and latch 240 are connected to data bus 406 (FIG. 4).

The Q output of flip-flop 121 is connected as the C input of flip-flop 123 and as the third input of AND gate 112, output of which is supplied as the J input of flip-flop 124. The $\overline{\text{Q}}$ output of flip-flop 124 is connected as an input to counters 210-212 and, as mentioned above, an input of AND gate 110. The Q output of flip flop 124 is supplied to processor 403 (FIG. 4).

Output of NAND gate 111 is connected as the J input of flip-flop 122. The Q output of flip-flop 122 is provided as the third input to AND gate 113. Finally, output of AND gate 113 is returned as the K input of flip-flop 122 and, through inverter 102 (for example, a 74LS04), is connected as the C input of flip-flop 124. Having thus completed the interconnection description of this embodiment of the invention, operation of the circuit can now be understood.

OPERATION

Vertical Scan

Referring to FIG. 4, in this particular embodiment of the invention, seven signals are supplied as inputs to detection circuit 405 (shown in detail in FIGS. 1 and 2). $\overline{\text{DTCK}}$, from CRT main timing unit 401, indicates the falling edge of a cyclic clock pulse. HIT, from light pen 404, indicates whether an illuminated dot is currently being sensed by the light pen. HBLANK and VBLANK, from video timing unit 402, indicate whether a horizontal or vertical trace is underway. $\overline{\text{LPV}}$ and $\overline{\text{LPH}}$, generated by processor 403, initiate reading of vertical and horizontal position information onto data bus 406. Finally, $\overline{\text{LPTEST}}$ is used for test and checkout purposes and is maintained high during normal CRT operations.

Referring now to FIGS. 1, 2, and 3 together, light detection signal HIT is high at times when an illuminated dot is not sensed by the light pen. Therefore, at the beginning of a vertical scan HIT is high and remains high until the CRT beam, in the course of performing the scan, reaches the first dot location within the sensing field of the light pen. In FIG. 3, this dot is on line 302 at column F, or possibly column E if the light pen is sensitive enough to register the light from the portion of the dot location at column E which falls within the aperture periphery. When the light pen detects light from a dot, HIT goes low. The HIT signal is inverted by inverter 100 and is connected to one of the inputs of AND gate 110. Signal HBLANK is low during horizontal scanning and goes high during horizontal retrace. HBLANK is also connected, through inverter 101, to AND gate 110. The third input to AND gate 110 is $\overline{\text{Q}}$ output of flip flop 124. This output is normally high during the scan and will be discussed in more detail below.

When light is detected by the light pen during a horizontal scan, the three inputs to AND gate 110 will be high. Output of AND gate 110 is now high and is supplied to J inputs of flip-flops 120 and 121. Since $\overline{LPV}$ goes low only during vertical retrace, C input of flip-flop 121 will be high whenever a vertical trace is in progress and flip flop 121 will operate in the synchronous mode.

At the first $\overline{DTCK}$ pulse after an illuminated location is detected, Q output of flip flop 120 goes high supplying a high signal to one of the inputs of NAND gate 114, and $\overline{Q}$ output goes low, causing output of NAND gate 130 to go high. This results in a high input to NAND gate 115 and to J input of flip-flop 123.

Q output of flip flop 121 also goes high, causing a high signal to one of the inputs of AND gate 112 and causing the C input of flip flop 123 to go high. Once the Q output of flip flop 121 goes high, it remains high until reset during vertical retrace, discussed below.

Since the C input to flip flop 123 is low prior to light detection, flip flop 123 had been operating in the asynchronous mode with its $\overline{Q}$ output being held high. Therefore, at the first $\overline{DTCK}$ pulse after the light hit is detected, both inputs to NAND gates 114 and 115 are satisfied. The output of gate 114 causes latch 240 to latch the information about the present vertical position. Output of gate 115 causes cascading counters 210, 211, and 212 to reset to the preloaded value and start counting. These counters are stimulated by $\overline{DTCK}$, through inverter 103, and increment by one at each clock pulse. As mentioned earlier, the time between $\overline{DTCK}$ pulses defines the size of an individual dot, or discrete stimulatable segment, on a raster line. Therefore, each $\overline{DTCK}$ pulse is equivalent to the beam traveling horizontally along the raster line for one dot.

Counters 210, 211, and 212, in this embodiment, are each 4 bit up counters. When connected in cascaded fashion, as shown in FIG. 2, they can count to a cumulative total of 4096. The counters are preset to a value such that they will fill up after number of clock pulses corresponding to number of dots on a horizontal line of the display plus number of clock pulses which occur during horizontal retrace. In this particular embodiment of the invention, 640 lock pulses occur during the scan of each raster line. This can be considered as 640 individual dots per horizontal raster line. Other numbers can be used and the present invention is not limited to any specific set of numbers of dots. During horizontal retrace 240 clock pulses will occur for a total of 880 clock pulses per complete horizontal scan cycle. Counters 210-212 are therefore preset to 3217 so that after 879 increments (i.e. at 4096) carry-over output of counter 212 goes high and the counters return to 3217 to begin the cycle again. As implemented in this embodiment the counters are continually in a count cycle except for a brief period, discussed below, at the end of vertical scan.

As mentioned earlier, aperture of the light pen is fairly large in relationship to separation of raster lines. As the beam scans line 301, no illuminated dot is detected. On line 302 the light pen will detect light at column E or F. This restarts counters 210, 211, and 212 as discussed above. At the next clock pulse, Q output of flip flop 123 is set to low, thereby inhibiting restarting of counters 210-212 until flip flop 123 has been reset during horizontal retrace. That is, counters 210-212 can be restarted only once per raster line. At the end of horizontal scan of line 302, the counters will have counted the number of clock pulses equivalent to the number of dots from where light was detected to the end (not shown) of the line at the right edge of the CRT screen.

During horizontal retrace, for example between lines 302 and 303, mechanisms for restarting counters 210-212 are reenabled. As horizontal retrace begins, HBLANK goes high. This results in the J input of flip-flop 120 being low and the K input being high and, at the next clock pulse, Q output of flip-flop 120 goes high. Both inputs to NAND gate 130 are now high, since $\overline{Q}$ output of flip-flop 220 is high at this time. Now the J input of flip-flop 123 is low and, at the following $\overline{DTCK}$ cycle, $\overline{Q}$ output of flip-flop 123 goes high. NAND gates 114 and 115 now each have one input high and are ready for output of NOR gate 130 to go high on a subsequent horizontal scan.

It can be seen from FIG. 3 that the light pen will detect an illuminated location on line 303 closer to the left boundary or edge of the CRT raster than on line 302 (i.e. before counters 210-212 have filled). A new vertical position will be held in latch 240 and counters 210-212 will be reloaded to their preset values and again start counting, in the manner discussed above. Vertical column B and line 305 in FIG. 3 presents to the light pen the earliest dot source of light and thus the earliest horizontal detection of light during that frame. Therefore, as the beam completes the scan of line 305 and begins to scan line 306, counters 210-212 will fill before light is detected, since the dots seen by the light pen are getting farther from the left edge of the screen.

Referring back to FIG. 2, when counters 210-212 become filled, output of counter 212, connected to flip-flop 220 and inverter 200, goes high. This causes the $\overline{Q}$ output of flip-flop 220 to go low at the next clock pulse. This $\overline{Q}$ output is connected to an input of NAND gate 130 and causes output of gate 130, and therefore input of NAND gate 115, to go high. The other input to NAND gate 115 is high since it is set high during each horizontal retrace and is not reset by the high output from NAND gate 130 until the next clock pulse. Therefore both inputs of gate 115 are high and counters 210-212 are reset. In this manner counters will continue to count, fill and be reset for the rest of the vertical scan at the dot location corresponding to the earliest horizontal light detection.

As discussed above, latch 240 will latch in the vertical location of the first light detection and will relatch a new value at each light detection which occurs closer to the left edge of the CRT in subsequent horizontal scans. Once the earliest light is detected, counters 210-212 will fill prior to detection of light on subsequent scans. When the counters fill, input to gate 130 goes low causing the J input of flip-flop 123 to go high. At the next clock pulse, $\overline{Q}$ output of flip flop 123 goes low, thereby disabling NAND gate 114 and preventing any further changes to the value stored in latch 240. Therefore, once the earliest light point has been located, the value in the latch is retained during the rest of the frame.

End of Vertical Scan

If light is detected at any time during the frame, the Q output of flip flop 121 is set high and remains high until reset during vertical retrace. As the last horizontal line scan is completed, both HBLANK and VBLANK to high causing the J input of flip flop 124 to go high. As described in more detail below, the C input of flip flop 124 is high except during CPU polling. Therefore, at the next clock pulse, after vertical retrace has begun, the $\overline{Q}$ output of flip flop 124 goes low, which stops counters 210-212 and removes the high input from AND gate 110. In addition, the Q output of flip flop 124 goes high, which indicates to the CPU that position information from counters 210-212 and latch 240 is available to be read onto the data bus.

CPU Polling and Light Pen Circuit Reset

After a vertical scan has been completed, the CPU will monitor Q output of flip flop 124 to determine if light was detected. If so, $\overline{LPH}$ signal is generated to read contents of counters 210-212 and then the $\overline{LPV}$ signal is generated to read the vertical position information from latch 240 and reset the circuit.

In this particular embodiment of the invention, ten output lines are used to convey the horizontal dot position information to the CPU. Because the CPU used in this embodiment is an eight-bit processor, the eight bits from counters 210 and 211 are grouped through buffer 230 and read onto the data bus at one time. The two high order bits are read on the subsequent processing cycle. These ten bits contain the information about the horizontal location of the left most dot sensed by the light pen on the raster line most centrally located under the light pen sensing aperture. An offset bias is then added to this number in software to yield the horizontal dot location most centrally located under the light pen.

The $\overline{LPV}$ signal, which is normally high, goes low to initiate polling of latch 240. The $\overline{LPV}$ signal, when low, also performs a reset function by bringing the C input of flip flop 121 low, resulting in Q output of flip flop 121 being set low. When $\overline{LPV}$ comes back high Q output of flip flop 121 remains low until set high by a high output from gate 110 on a subsequent scan cycle. In addition, $\overline{LPV}$ low causes output of NAND gate 111 to go high. At the next $\overline{DTCK}$ pulse, the Q output of flip flop 122 goes high. Since retrace is in progress, all inputs to AND gate 113 are high resulting in a high output to inverter 102. Inventor 102 brings the C input of flip flop 124 low which resets the flip flop 124 $\overline{Q}$ output to low and the Q output to high, which restarts counters 210-212. The counters are, therefore, running during vertical trace and retrace, except for the period between the end of the scan and processor polling of vertical position.

Output of AND gate 113 is returned to the K input of flip flop 122. At the next $\overline{DTCK}$ pulse, the high K input to flip flop 122 resets the Q output to low, which brings the C input of flip-flop 124 high. The circuit is now returned to a state of readiness for the next frame.

In summary, logic devices and cascaded clock cycle counters are used to identify and provide information about the vertical and horizontal location of the earliest horizontal detection of an illuminated CRT location by the light pen during each frame. By determining the earliest detection, the location information provided to the processor will be on a raster line which is substantially contrally located under the light pen aperture, thereby reducing jitter in the displayed cursor.

The invention may be embodied in yet other specific forms without departing from the spirit or essential characteristics thereof. The present embodiments are therefore to be considered in all respects as illustrative and not restrictive. The scope of the invention is indicated by the appended claims rather than by the foregoing description, and all changes which come within the meaning and range of equivalency of the claims are therefore intended to be embraced therein.

What is claimed is:

1. In a raster scan CRT and light pen apparatus, said apparatus having a source of clock cycle pulses, a circuit for detection of the location of the sensing aperture of a light pen on the face of the CRT, said CRT face being scanned by simultaneously moving the electron beam of said CRT in two directions, a first direction and a second direction, said second direction being substantially perpendicular to said first direction, the movement in said first direction being substantially more rapid than the movement in said second direction, said circuit comprising:

means for determining if an illuminated CRT location has been detected by said light pen during a scan;

means for retaining position information descriptive of the location in said second direction at which said illuminated location was detected;

means responsive to clock cycle pulses for counting said clock cycle pulses;

means for setting and starting said clock cycle counter means when said illuminated location is detected;

first means for resetting and again starting said counter means, said first means to perform resetting and starting of said counter means when the beam of the CRT has reached the same position in said first direction at which said counter means was started on the previous raster line;

second means for resetting and again starting said counter means, said second means to perform resetting and starting of said counter means when an illuminated location on a raster line is detected by said light pen before said beam of the CRT has reached the same position in said first direction at which said counter means was started on the previous raster line;

means for replacing the information in said second direction position retaining means when said counter means is started by said second means;

means for insuring that said counter means can be started only once per raster line scan; and means for resetting said circuit.

2. In a raster scan CRT and light pen apparatus, said apparatus having a source of clock cycle pulses, a circuit for detection of the location of the sensing aperture of a light pen on the face of the CRT, said CRT face being scanned by simultaneously moving the electron beam of said CRT in two directions, a first direction and a second direction, said second direction being substantially perpendicular to said first direction, the movement in said first direction being substantially more rapid than the movement in said second direction, said circuit comprising:

means for determining if an illuminated CRT location has been detected by said light pen during a scan;

means for retaining position information descriptive of the location in said second direction at which said illuminated location was detected;

means responsive to clock cycle pulses for counting said clock cycle pulses;

first means for resetting and restarting said counter means, said first means to perform resetting and restarting of said counter means when said clock cycle counter means has counted a number of clock cycle pulses equivalent to one complete raster line scan cycle;

second means for resetting and restarting said counter means, said second means to perform resetting and restarting of said counter means when an illuminated location on a raster line is detected by said light pen before said counter means is restarted by said first means;

means for replacing the information in said second direction position retaining means when said counter means is restarted by said second means;

means for insuring that said counter means can be started only once per raster line scan cycle; and means for resetting said circuit.

3. Electronic apparatus for determining location of the sensing aperture of a light pen on the face of a raster scan CRT, said detecting apparatus comprising:

means for determining if an illuminated location is detected by said light pen during a frame;

means for retaining information descriptive of the vertical position at which said illuminated location was detected;

means for retaining information descriptive of the horizontal position at which said illuminated location was detected;

means for revising the information in said vertical position information retaining means if, during the same frame, an illuminated location is detected on a subsequent raster line before the electron beam of said CRT has reached the horizontal position on said subsequent raster line corresponding to the position information stored in said horizontal position information retaining means;

means for revising the information in said horizontal position information retaining means if, during the same frame, an illuminated location is detected on a subsequent raster line before the electron beam of said CRT has reached the horizontal position on said subsequent raster line corresponding to the position information stored in said horizontal position information retaining means.

4. The circuit as recited in claim 1, 2 or 3, said circuit further comprising means for generating a signal to indicate that at least one illuminated location was detected during a frame.

5. The circuit as recited in claim 1, 2 or 3, said circuit further comprising means for stopping said counter means at the end of the scan of a raster line, such that the contents of said counter means are retained until reset.

6. The circuit as recited in claim 5 wherein said counter means are stopped at the end of the scan of the final raster line scanned prior to initiation of retrace in said second direction.

7. The circuit as recited in claim 1, or 2 wherein said counter means comprises at least one clock cycle counter.

8. The circuit as recited in claim 7 wherein said at least one clock cycle counter is preset such that it will generate an output to said first counter restart means when the CRT beam has returned to the same position in said second direction as said at least one counter was last started.

9. The circuit as recited in claim 8 wherein said at least one clock cycle counter comprises three cascaded four-bit binary up-counters.

10. The circuit as recited in claim 1, or 2 or 3 wherein said first direction is substantially horizontal and said second direction is substantially vertical.

11. In an interactive information entry, processing and readout system; said system having at least a raster scan CRT, the CRT face being scanned by simultaneously moving the electron beam of the CRT in two directions, a first direction and a second direction, said second direction being substantially perpendicular to said first direction, the movement is said first direction being substantially more rapid than the movement in said second direction; a light pen; a central processing unit; a source of clock pulses; and a circuit for detection of the location of the sensing aperture of a light pen on the face of said CRT, said circuit having at least one clock pulse counter; a method for determining the location of the sensing aperture on the face of said CRT comprising the steps of:

(a) monitoring for an indication that said at least one counter has counted a number of clock pulses equivalent to a return by said CRT electron beam to the same position in said first direction as said at least one counter was started on the previous scan line;

(b) in response to said indication, loading and restarting said at least one counter and inhibiting counter restart and latching of position in said second direction for the remainder of the scan of the raster line;

(c) monitoring for an indication that light has been detected while scans are in progress in said first direction and said second direction;

(d) in response to said indication of light detection, latching the present position information in said second direction, loading and starting said at least one counter, and inhibiting restart of said at least one counter for the remainder of the scan of the raster line;

(e) repeating steps (a)-(d) at each clock pulse during the scan in said second direction;

(f) stopping said at least one counter at the first clock pulse after the scan of the final raster line has been completed, if an illuminated location was sensed during the frame; and (g) restarting said at least one counter.

12. In an interactive information entry, processing and readout system; said system having at least a raster scan CRT, the CRT face being scanned by simultaneously moving the electron beam of the CRT in two directions, a first direction and a second direction, said second direction being substantially perpendicular to said first direction, the movement is said first direction being substantially more rapid than the movement in said second direction; a light pen; a central processing unit; a source of clock pulses; and a circuit for detection of the location of the sensing aperture of a light pen on the face of said CRT, said circuit having at least one clock pulse counter; a method for determining the location of the sensing aperture on the face of said CRT comprising the steps of:

(a) monitoring for an indication that said at least one counter has counted a number of clock pulses equivalent to a return by said CRT electron beam to the same position in said first direction as said at least one counter was started on the previous scan line;

(b) in response to said indication, latching the present contents of said at least one counter;

(c) monitoring for an indication that light has been detected while scans are in progress in said first direction and said second direction;

(d) in response to said indication of light detection, latching the number of the present location in said second direction, loading and starting said counters, and inhibiting restart of said counters for the remainder of the scan of the raster line;

(e) repeat steps (a)-(d) at each clock pulse during the scan in said second direction;

(f) stopping said at least one counter at the first clock pulse after the scan of the final raster line has been completed; and (g) restarting said at least one counter.

13. In a raster scan CRT system, said system having a light pen and means for indicating the horizontal and vertical position of the electron beam of said CRT, a method for determining the location of the sensing aperture of said light pen on the face of the CRT comprising the steps of:

(a) monitoring for indication that light is detected by said light pen;

(b) If light is detected, retaining information indicative of the vertical position of said light detection unless said retention is inhibited, inhibiting further retention of said vertical position information for the remainder of the raster line; resetting said horizontal position indicating means, and inhibiting resetting of said horizontal position indicating means for the remainder of the raster line;

(c) repeating steps (a) and (b) for each location along each raster line until light is detected;

(d) monitoring for an indication from said horizontal position indicating means that the electron beam of said CRT has returned to the same horizontal position at which said horizontal position indicating means was last reset;

(e) in response to said indication from said horizontal position indicating means, resetting said horizontal position indicating means, inhibiting updating of said vertical position information and inhibiting further resetting of said horizontal position indicating means for the remainder of the raster line;

(f) repeating steps (a), (b), (d) and (e) for each location along each raster line for the remainder of the frame.

14. The method as recited in claim 11, 12 or 13, further comprising the steps of:

generating a signal indicating that the light pen location data is ready for reading by said CPU;

generating a signal by said CPU to initiate reading of said location data;

reading said data;

resetting said circuit in preparation for the next vertical scan; and correcting the position data in said first direction for offset.

15. The method as recited in claims 11 or 12 wherein said first direction is substantially horizontal and said second direction is substantially vertical.

* * * * *